(12) United States Patent
Sadikov et al.

(10) Patent No.: US 8,423,538 B1
(45) Date of Patent: Apr. 16, 2013

(54) CLUSTERING QUERY REFINEMENTS BY INFERRED USER INTENT

(75) Inventors: Eldar Sadikov, Menlo Park, CA (US); Jayant Madhavan, San Francisco, CA (US); Alon Halevy, Los Altos, CA (US)

(73) Assignee: Google Inc., Mountain View, CA (US)

( * ) Notice: Subject to any disclaimer, the term of this patent is extended or adjusted under 35 U.S.C. 154(b) by 20 days.

(21) Appl. No.: 12/938,205

(22) Filed: Nov. 2, 2010

Related U.S. Application Data

(60) Provisional application No. 61/257,435, filed on Nov. 2, 2009.

(51) Int. Cl.
*G06F 7/00* (2006.01)
*G06F 17/00* (2006.01)

(52) U.S. Cl.
USPC .......................... 707/722; 707/706; 707/713

(58) Field of Classification Search .................. 707/732, 707/706, 713, 721
See application file for complete search history.

(56) References Cited

PUBLICATIONS

Nir Ailon et al., "Aggregating Inconsistent Information: Ranking and Clustering", Oct. 2008, Journal of the ACM, vol. 55, No. 5, Article 23, 27 pages.
Peter Anick, "Using Terminological Feedback for Web Search Refinement—A Log-based Study", 2003, in SIGIR '03: Proceedings of the 26th annual international ACM SIGIR conference on Research and development in information retrieval, pp. 88-95.
Ricardo Baeza-Yates et al., "Query Recommendation Using Query Logs in Search Engines", Nov. 2004, vol. 3268/2004 of Lecture Notes in Computer Science, pp. 588-596.
Nikhil Bansal et al., "Correlation Clustering", 2004, Machine Learning, 56, pp. 89-113.
Doug Beeferman et al., "Agglomerative clustering of a search engine query log", 2000, in KDD '00: Proceedings of the sixth ACM SIGKDD International Conference on Knowledge Discovery and Data Mining, pp. 407-416.
Bodo Billerbeck et al., "Query Expansion using Associated Queries", 2003, in CIKM '03: Proceedings of the Twelfth International Conference on Information and Knowledge Management, pp. 2-9.
Paolo Boldi et al., "The Query-flow Graph: Model and Applications", 2008, in CIKM '08: Proceeding of the 17th ACM conference on Information and Knowledge Management, 9 pages.
Huanhuan Cao et al., "Context-Aware Query Suggestion by Mining Click-Through and Session Data", 2008, in KDD '08: Proceeding of the 14th ACM SIGKDD International Conference on Knowledge Discovery and Data Mining, 9 pages.
Steve Chien et al., "Semantic Similarity Between Search Engine Queries Using Temporal Correlation", 2005, in WWW '05: Proceedings of the 14th International Conference on World Wide Web, pp. 2-11.

(Continued)

*Primary Examiner* — Usmaan Saeed
*Assistant Examiner* — Paul Kim
(74) *Attorney, Agent, or Firm* — Fish & Richardson P.C.

(57) ABSTRACT

Methods, systems, and apparatus, including computer programs encoded on computer storage media, for clustering query refinements. One method includes building a representation of a graph for a first query, wherein the graph has a node for the first query, a node for each of a plurality of refinements for the first query, and a node for each document in the document sets of the refinements, and wherein the graph has edges from the first query node to each of the refinement nodes, edges from the first query to each document in the respective document set of the first query, edges from each refinement to each document in the respective document set of the refinement, and edges from each refinement to each co-occurring query of the refinement. The method further includes clustering the refinements into refinement clusters by partitioning the refinement nodes in the graph into proper subsets.

5 Claims, 8 Drawing Sheets

PUBLICATIONS

Nick Craswell et al., "Random Walks on the Click Graph", 2007, in SIGIR '07: Proceedings of the 30th Annual International ACM SIGIR Conference on Research and Development in Information Retrieval, 8 pages.

Silviu Cucerzan et al., "Extracting Semantically Related Queries by Exploiting User Session Information", 2005, Technical Report, Microsoft Research, pp. 1-10.

Hang Cui et al., "Probabilistic Query Expansion Using Query Logs", 2002, in WWW '02: Proceedings of the 11th International Conference on World Wide Web, 8 pages.

Bruno M. Fonseca et al., "Concept-Based Interactive Query Expansion", 2005, in CIKM '05: Proceedings of the 14th ACM International Conference on Information and Knowledge Management, 8 pages.

Olivier Goldschmidt et al., "Polynomial Algorithm for the k-CUT Problem", 1988, in SFCS '88: Proceedings of the 29th Annual Symposium on Foundations of Computer Science, pp. 444-451.

Qi He et al., "Web Query Recommendation via Sequential Query Prediction", 2009, in ICDE '09: Proceedings of the 2009 IEEE International Conference on Data Engineering, pp. 1443-1454.

Chien-Kang Huang et al., "Relevant Term Suggestion in Interactive Web Search Based on Contextual Information in Query Session Logs", May 2003, Journal of the American Society for Information Science and Technology, 54(7), pp. 638-649.

A. K. Jain et al., "Data Clustering: A Review", Sep. 1999, ACM Computing Surveys, vol. 31, No. 3, pp. 264-323.

Christopher D. Manning et al., "Introduction to Information Retrieval", 2008, Cambridge University Press, pp. 346-356.

Qiaozhu Mei et al., "Query Suggestion Using Hitting Time", 2008, in CIKM '08: Proceeding of the 17th ACM Conference on Information and Knowledge Management, pp. 469-477.

Huzur Saran et al., "Finding k-cuts within Twice the Optimal", 1991, in SFCS '91: Proceedings of the 32nd Annual Symposium on Foundations of Computer Science, pp. 743-751.

Howard M. Taylor et al., "An Introduction to Stochastic Modeling", Revised Edition, 1994, Academic Press, Inc., pp. 89-240.

Xuanhui Wang et al., "Mining Broad Latent Query Aspects from Search Sessions", 2009, in KDD '09: Proceedings of the 15th ACM SIGKDD International Conference on Knowledge Discovery and Data Mining, pp. 867-875.

Ji-Rong Wen et al., "Clustering User Queries of a Search Engine", 2001, in WWW '01: Proceedings of the 10th International Conference on World Wide Web, pp. 162-168.

Zhiyong Zhang et al., "Mining Search Engine Query Logs for Query Recommendation", May 2006, in WWW '06: Proceedings of the 15th International Conference on World Wide Web, pp. 1039-1040.

CLUSTERING QUERY REFINEMENTS BY INFERRED USER INTENT

CROSS-REFERENCE TO RELATED APPLICATIONS

This application claims the benefit of U.S. Provisional Application Ser. No. 61/257,435, filed on Nov. 2, 2009, under 35 U.S.C. §119(e). The disclosure of the prior application is considered part of and is incorporated by reference in the disclosure of this application.

BACKGROUND

The subject matter of this specification relates generally to search systems.

Web search engines today often complement the search results with a list of related search queries. For example, given the query "mars," a search engine can return the related queries "mars god of war," "mars planet," "venus," "jupiter," etc. These related search queries help users to find and explore information related to the original query. Furthermore, because users often provide short queries with little or no context, related queries allow users to further specify their information needs. For example, by clicking on "mars god of war," a user signals interest in the Roman god as opposed to the planet Mars.

Related queries are typically mined from the query logs by finding other queries that co-occur in sessions with the original query. Specifically, query refinements, a particular kind of related queries, are obtained by finding queries that are most likely to follow the original query is a user session. For many popular queries, there may be hundreds of related queries mined from the logs using this method. However, given the limited available space on a search results page, search engines typically only choose to display a few of the related queries.

SUMMARY

This specification describes technologies relating to clustering of query refinements of a user search query.

One of the goals of the technologies described in this specification is to group refinements of a search query into clusters that are likely to represent distinct information needs. The clusters computed by the presently proposed algorithm in this specification can be used to improve the selection and placement of the query suggestions presently proposed by a search engine, and can also serve to summarize the different aspects of information relevant to the original user query.

In one aspect, the problem of clustering query refinements is defined as a graph clustering problem. The graph captures the users' behavior with transitions between pairs of queries and queries to documents. The graph effectively incorporates both content based similarity as well as session co-occurrence similarity mined from the query logs. The graph has a natural probabilistic interpretation as a Markov model. The presently proposed algorithm clusters refinements based on their likely underlying user intents by combining document click and session co-occurrence information. Principally, the presently proposed algorithm operates by performing multiple random walks on a Markov graph that approximates user search behavior. The random walks lead to a set of most likely visited documents for each query and the algorithm then clusters queries based on this information. In one implementation, the presently proposed algorithm relies on complete-link clustering, but the presently proposed model and algorithm are generally flexible to utilize many different types of clustering techniques.

In general, one innovative aspect of the subject matter described in this specification can be embodied in methods including the actions of: A computer-implemented method, comprising: identifying a plurality of refinements of a first search query, each refinement being a search query that follows the first search query in at least one session of queries submitted to a search system; identifying a document set of each of the refinements, the document set of a refinement being documents that are search results presented in response to the refinement by the search system and that have received user selections while being presented as the search results; building a representation of a graph for the first search query, wherein the graph has a node for the first search query, a node for each of the refinements, and a node for each document in the document sets of the refinements, and wherein the graph has edges from the first search query node to each of the refinement nodes, edges from the first search query node to each document in the respective document set of the first search query, edges from each refinement to each document in the respective document set of the refinement, and edges from each refinement to each co-occurring query of the refinement; and clustering the refinements into refinement clusters by partitioning the refinement nodes in the graph into proper subsets.

Other embodiments of this aspect include corresponding systems, apparatus, and computer programs, configured to perform the actions of the methods, encoded on computer storage devices.

These and other embodiments can each optionally include one or more of the following features.

In some implementations, the methods further include the actions of: receiving the first search query as a query in a search session; and providing, in a response to the first search query, each of one or more of the refinement clusters as a search suggestion.

In some implementations, each search suggestion is provided as a selectable user interface element on a graphic user interface.

In some implementations, each search suggestion is provided as a selectable hyperlink having anchor text matching one of the refinements in the refinement cluster of the search suggestion.

In general, another innovative aspect of the subject matter described in this specification can be embodied in methods that include the actions of: identifying a plurality of refinements $R(q)$ of a first search query $q$, each refinement $r \in R(q)$ being a search query that follows the first search query $q$ in at least one session of queries submitted to a search system; identifying a document set $D(r)$ of each of the refinements $r$, the document set of a refinement being the documents $d$ that are search results presented in response to the refinement by the search system and that have received user selection while being presented as the search results; and building a representation of a graph $G$ for the first search query $q$, wherein the graph $G$ has a node for the first search query $q$, a node for each of the refinements $r$, and a node for each document $d$ in the document sets of the refinements, and wherein the graph $G$ has edges from the first search query node $q$ to each of the refinement nodes $r$, edges from the first search query $q$ to each document in the respective document set $D(q)$ of the first search query $q$, edges from each refinement to each document in the respective document set $D(r)$ of the refinement, and edges from each refinement to each co-occurring query of the refinement.

The methods further include the action of building a transition probability matrix P for the graph G that includes the following elements:

for each edge $(r_i, d)$, where $d \in D(r_i)$ and $n_d(d|r_i)$ is the number of user selections received by document d, a result of the query $r_i$, then:

$$P[r_i, d] = \varepsilon \times \frac{n_d(d|r_i)}{\sum_{d_k \in D(r_i)} n_d(d_k|r_i)},$$

for each edge $(r_i, r_j)$, where $r_j$ is a refinement of both $r_i$ and q (i.e., $r_j \in R(q) \cap R(r_i)$), and $n_s(r_i, r_j)$ is the number of sessions in which $r_i$ and $r_j$ co-occur, then:

$$P[r_i, r_j] = (1-\varepsilon) \times \frac{n_s(r_i, r_j)}{\sum_{r_k \in R(q) \cap Q(r_i)} n_s(r_i, r_k)},$$

for each document d (all of which are terminal in G), then self-transitions:

$$P[d,d]=1,$$

where $\epsilon$ is a numerical parameter between 0 and 1.

The methods further include the action of: calculating a visit probability vector for each refinement in the plurality of refinements R(q) from the transition probability matrix P, where each vector has elements representing a probability for each document in the document set D(q) and the document sets of the refinements R(q); and clustering the refinements into refinement clusters by partitioning the visit probability vectors into proper subsets.

Other embodiments of this aspect include corresponding systems, apparatus, and computer programs, configured to perform the actions of the methods, encoded on computer storage devices.

In general, another innovative aspect of the subject matter described in this specification can be embodied in methods that include the actions of: identifying a plurality of refinements R(q) of a first search query q, each refinement $r \in R(q)$ being a search query that follows the first query q in at least one session of queries submitted to a search system; identifying a document set D(r) of each of the refinements r, the document set of a refinement being the documents d that have been presented as search results in response to the refinement by the search system and that have received user selections while being presented as the search results; building a representation of a graph G for the first search query q, wherein the graph G has a node for the first search query q, a node for each of the refinements r, a node for each document d in the document sets of the refinements, and an off-topic node for an off-topic state f, and wherein the graph G has edges from the first search query node q to each of the refinement nodes r, edges from the first search query q to each document in the respective document set D(q) of the first search query q, edges from each refinement to each document in the respective document set D(r) of the refinement, and edges from each refinement to each co-occurring query Q(r) of the refinement and to the off-topic node.

The methods further include the action of building a transition probability matrix P for the graph G that includes the following elements:

for each edge $(r_i, d)$, where $d \in D(r_i)$ and $n_d(d|r_i)$ is the number of user selections received by the document d, a result of the query $r_i$:

$$P[r_i, d] = \varepsilon \times \frac{n_d(d|r_i)}{\sum_{d_k \in D(r_i)} n_d(d_k|r_i)},$$

for each edge $(r_i, f)$:

$$P[r_i, f] = (1-\varepsilon) \times \frac{\sum_{q' \in (Q(r_i) - R(q))} n_s(r_i, q')}{\sum_{q' \in Q(r_i)} n_s(r_i, q')},$$

for each edge $(r_i, r_j)$:

$$P[r_i, r_j] = (1-\varepsilon) \times \frac{n_s(r_i, r_j)}{\sum_{q' \in Q(r_i)} n_s(r_i, q')},$$

for each document d (all of which are terminal in G), then self-transitions:

$$P[d,d]=1,$$

where $\epsilon$ is a numerical parameter between 0 and 1.

The methods further include the actions of: calculating a visit probability vector for each refinement in the plurality of refinements R(q) from the transition probability matrix P, where each vector has elements representing a probability for each document in the document set D(q) and the document sets of the refinements R(q); and clustering the refinements into refinement clusters by partitioning the visit probability vectors into proper subsets.

Other embodiments of this aspect include corresponding systems, apparatus, and computer programs, configured to perform the actions of the methods, encoded on computer storage devices.

Particular embodiments of the subject matter described in this specification can be implemented so as to realize one or more of the following advantages.

For example, a more diverse set of query refinements can be selected using the techniques presently proposed in this specification as compared to the query refinements selected using the conventional techniques referred to in this specification. In general, there is only space for a few related queries in a search result page. Therefore, it is beneficial to select a diverse set of related queries that correspond to a diverse set of distinct information needs. For example, it is less than ideal to present all the related queries for "mars" that are about the planet alone. Instead, it is better to present related queries that are representative of the various interests people might have that are related to the query "mars." Conventional solutions to selecting related queries rely more on frequency than on diversity. For example, the presently proposed clustering method as described in this specification can produce results indicating that for "mars," while the most popular cluster pertains to names of planets, the second most popular cluster pertains to the Mars chocolate bar, followed by clusters that pertain to facts about the planet Mars, then the Mars rovers, and so on. Thus, using the presently proposed clustering methods, a related query from each cluster can be selected and presented in a search result page. In contrast, a search engine that relies on query frequency in selecting query refinements would not likely present any related queries in the second cluster (e.g., "mars candy" or "mars chocolate bar") in the top refinements for the query due to the queries' relatively low query frequency as compared to the related queries in the first cluster.

In addition, clustering can be used to improve the placement of related queries on the search results page. Related queries are often placed in rows or columns. When related queries from the same cluster are shown in the same row or column, users can better understand the significance and meaning of the query refinements that are presented. Such cluster-aware layouts of query refinements have the potential for increasing the number of related queries that can be displayed as the layouts will appear less cluttered and less likely to pose an information overload for users.

In addition, based on the presently proposed algorithms, related-query suggestions or query refinements can be improved across user sessions. For example, if a user poses the query "Pluto" after "mars," it is more likely that the user is interested in the solar system rather than the Disney character Pluto the Dog. Hence, it makes more sense to propose related searches for "pluto" that pertain to planets or facts about planets, rather than Disney characters.

In addition, the clusters provide a summary of the possible diverse interests and information needs that people may have about a given query (as expressed by the queries they pose). For example, our cluster analysis indicates that for "mars," there are large distinct clusters of user queries about planets in the Solar System and Mars the Roman god, and in addition, there are clusters of refinements about Mars candy bar and a Japanese comic strip. About the planet itself, there are distinct non-trivial clusters about facts about the planet, about the rovers sent by NASA, and about the speculation about life and water on the planet. Such summaries of the information relevant to a query can form the basis for other search-result interfaces, such as mashups that provide topics summaries.

Furthermore, the presently proposed algorithms can be effectively used to improve query suggestions over conventional approaches that are based on only session or only document click information.

The details of one or more embodiments of the subject matter described in this specification are set forth in the accompanying drawings and the description below. Other features, aspects, and advantages of the subject matter will become apparent from the description, the drawings, and the claims.

DETAILED DESCRIPTION

Figure 1A:
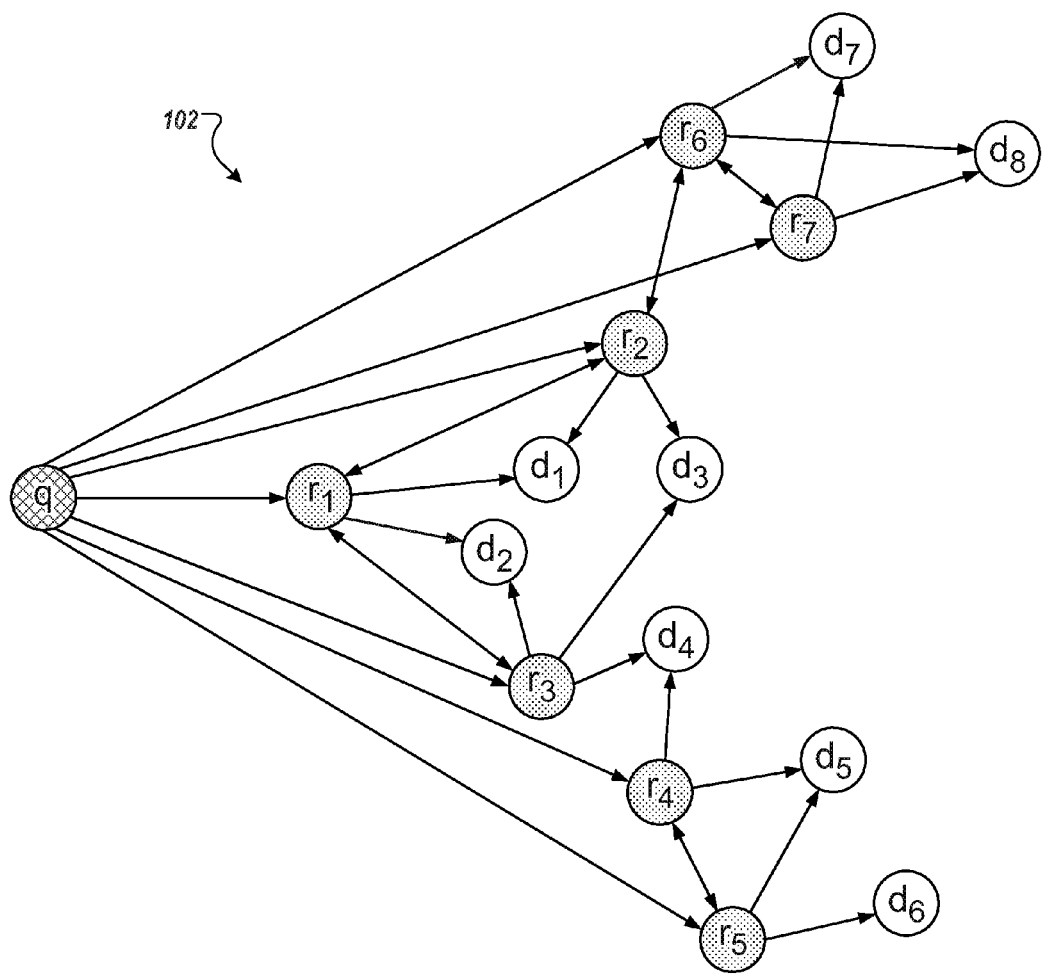
FIG. 1A illustrates an example graph that models user search behavior.

One approach to clustering related queries would be to apply techniques for basic query clustering. D. Beeferman and A. Berger, *Agglomerative clustering of a search engine query log* (in *KDD '00: Proceedings of the sixth ACM SIGKDD international conference on knowledge discovery and data mining*, pages 407-416, New York, N.Y., 2000) describes a system that groups queries that shared many similar clicked URLs. R. Baeza-Yates, C. Hurtado, and M. Mendoza, *Query Recommendation Using Query Logs in Search Engines* (volume 3268/2004 of *Lecture Notes in Computer Science*, pages 588-596, Springer Berlin/Heidelberg, November 2004) further presently proposed clustering based on the similarity in the vocabulary of the clicked URLs. However, these techniques fail to achieve all the clustering goals that are desirable in the context of providing query refinements. For example, for the query "mars," two possible query refinements "venus" and "jupiter" correspond to the same user intent of researching planets. However, the two queries "venus" and "jupiter" are unlikely to retrieve any search results in common with each other or with the query "mars." Because the queries "venus," "jupiter," and "mars" have few search results in common, the common search results that have also received user selections (e.g., user clicks) are even rarer. Consequently, these three queries are not likely to be clustered together based on the above basic query clustering techniques, even though they do reflect the same user intent of researching planets.

A second approach to query clustering would be to use query session logs to cluster query refinements. Specifically, two refinements could be clustered together if they co-occur in sessions that have similar queries. This approach is pursued by B. M. Fonseca, P. Golgher, B. Pôssas, B. Ribeiro-Neto, and N. Ziviani, *Concept-based interactive query expansion* (in *CIKM '05: Proceedings of the 14th ACM international conference on information and knowledge management*, pages 696-703, New York, N.Y., 2005), where given an initial query q, related queries q' co-occurring in sessions are grouped into clusters. Users are then asked to specify the cluster that best describes their information need. This approach is effective for clustering queries that are unrelated content-wise, such as "venus" and "jupiter." However, there are two challenges with clustering queries using the session data. First, session logs can be sparse (in comparison to document clicks), especially for infrequent queries, making it hard to infer statistically significant query relationships. Second, there is often a drift in user intent within the same session. For example, "mars" might be followed by "neptune" and "pluto," and then "pluto the dog," etc. Even though many queries may be transitively related to the original query in the same session, these queries do not necessarily represent the same intent or user interest as the original query.

In this specification, an approach is proposed that formulates the problem of clustering related queries as a graph-clustering problem. The graph includes nodes for related queries and nodes for documents that users navigate to from these queries. In one implementation, the graph captures the users' behavior as a Markov model over possible transitions between pairs of queries and between queries and documents. Formulated in that manner, clusters in the graph can capture the different users' intent that is relevant to a particular query. As described herein, the graph captures the intuition of content-based similarity with edges from queries to documents, and also captures similarity based on session co-occurrence with edges connecting pairs of queries.

The proposed approach described in this specification is different from previous research on mining search logs in at least three ways:

1. Both the click-through information (e.g., recorded user selections of search results) and the session information are combined in a coherent fashion in the model used for query clustering.

2. Query clustering is pursued in the context of a single original user query rather than in the global context of many queries or a query collection.

3. A Markov model is employed to capture the users' behavior in manners that are different from previous random walk models for query log mining. For example, (1) it combines both the click-through and session co-occurrence information; and (2) it is an absorbing Markov model which makes limiting distributions of a random walk be dependent on the start node (which is a feature exploited for the current problem definition).

When a graph is used to capture the users' behavior with transitions between pairs of queries and queries to documents, in principle, any clustering algorithm can be applied to the graph to find the user intents.

First, terminology used in this specification will be introduced, and the clustering problem is formulated. Assume that access to a search query log is available. To protect the privacy of users, the search session data (e.g., search queries and user selections of search results) stored in search query logs are completely anonymized so that the data cannot be associated with the users. For example, each query can be associated with a unique 128-bit number that is not associated with any user. Queries in the logs are divided into sessions. In general, a session is a period during which a user submits queries. A session can be measured in a number of ways including, for example, by a specified period of time (for example, thirty minutes), by a specified number of queries (for example, fifteen queries), until a specified period of inactivity (for example, ten minutes without submitting a query), while a user is logged-in to a system, or while a user submits queries that relate to similar topics. The goal is to cluster query refinements.

Definition 1: A query r is said to be a refinement of a query q, if r follows q in a session. R(q) denotes all the refinements of a query q.

Note that q does not need to be the first query in a session in order for r to be a refinement of q. Furthermore, the model described herein is agnostic to how query refinements are collected, but Definition 1 is provided because it is the one of the most common methods for determining refinements. In some implementations, other methods of collecting query refinements R(q) of a query q are possible.

Co-occurrence of query refinements are also modeled in this formulation:

Definition 2: The set of co-occurring queries of $q_i$, denoted by $Q(q_i)$, is the set of queries $q_j$, such that $q_i$ and $q_j$ occur in the same session.

It is also assumed that the query log specifies which documents were selected (e.g., clicked) as a search result presented in response to a query:

Definition 3: The document set of a query $q_i$ denoted $D(q_i)$, is the set of documents that users click on while the documents are presented as search results responsive to $q_i$ (e.g., search results responsive to $q_i$).

Note that $D(q_i)$ is collected from all sessions that include $q_i$.

User behavior is modeled as a graph. Given the query logs and a query q, the goal is to cluster the query refinements of q into a set of different information needs. The intuition underlying the presently proposed clustering algorithm is that two refinements are similar if they lead to the same content within a typical search session. The presently proposed graph model is based on the following typical user behavior.

Consider a user who might start a search session with an underlying intent, i.e., some, possibly abstract, information need. She poses a query she believes will satisfy her information need, e.g., "mars." If none of the search results satisfy her, she might pose another query that is likely to better capture her specific need, e.g., "mars pictures." If a result does satisfy her, she will inspect the results further by clicking on one or more of them. After clicking on a result, she might also pose another query to find more results relevant to her information need, e.g., "venus" after "mars," when the underlying intent is to research planets.

In some implementations, a graph G(q)=(V, E) can be constructed, that captures this behavior as follows (see FIG. 1A for an example). In the graph G, there is a respective node in V for the query q, for each of the query refinements in R(q), and for any document that is clicked. In other words, there is a node for every element of $\cup_{r \in R(q)} D(r)$. In the graph G, the set of edges, E, includes:

(i) for every $r \in R(q)$, edges (q, r) (i.e., the edges from the query q to each of its refinements);

(ii) for every $r \in q \cap R(q)$, and every $d \in D(r)$, edges (r, d) (i.e., the edges from r to each of its clicked result documents); and (iii) for every $r \in R(q)$ and $r_i \in Q(r)$, edges $(r, r_i)$ (i.e., the edges connecting co-occurring queries).

For example, as shown in FIG. 1A, in the graph 102, there is a respective node (e.g., nodes $r_1, \ldots, r_7$) for the query q and for each query refinement of the query q, and a respective node for each document (e.g., documents $d_1, \ldots, d_8$) that is clicked for the query q and/or the query refinements of q. Furthermore, there is an edge from the node representing the query q to the node representing each of q's query refinements (e.g., the edges $(q, r_1), \ldots, (q, r_7)$), an edge from the node representing each query to the node representing each of the query's clicked documents (e.g., the edges $(r_1, d_1), (r_1, d_2), (r_2, d_1), (r_2, d_3), (r_3, d_2), (r_3, d_3), (r_3, d_4), (r_4, d_4), (r_4, d_5), (r_5, d_5), (r_5, d_6), (r_6, d_7), (r_6, d_8), (r_7, d_7),$ and $(r_7, d_8)$). Furthermore, there is an edge between each pair of queries that are co-occurring queries (e.g., the edges $(r_1, r_2), (r_1, r_3), (r_4, r_5), (r_2, r_6),$ and $(r_6, r_7)$).

The following description generally assumes the context of a given query q, and the graph is simply referred to as G rather than G(q).

First, weights are assigned to edges in G based on information available in the query logs. For edges of the form (r, d), the edges are assigned weights proportional to the probability of user clicking on d as a search result of r. For edges of the form $(r, r_i)$, where r is either the query q or one of its refinements, the edges are assigned weights proportional to the probability of r and $r_i$ co-occurring in a search session. Note that for simplicity, the probabilities are not conditioned on sessions starting with the query q. This is permissible because it is unlikely that such conditioned probabilities can be obtained reliably, given the sparsity of such information in the query logs. However, if such conditional probabilities can be obtained, they could be used, in addition or alternatively.

In a first implementation, there are no edges from documents to queries (e.g., as shown in FIG. 1A). This is not a limitation, because if a user were to proceed as follows: $q \to r_1 \to d \to r_2 \ldots$, then $r_2$ is also, by definition, a refinement of q; and all subsequent user interactions after $r_2$ will also be accounted for in G.

The intuition underlying the presently proposed clustering technique as described in this specification is the following. Two query refinements of q, $r_i$ and $r_j$, represent the same underlying intent if a user typically reaches the same documents in sessions where q is followed by $r_i$ and in sessions where q is followed by $r_j$.

Consider the following example. When a user poses the query "mars," with the intent of researching planets, it is likely that she then subsequently queries one or more of "venus," "earth," "jupiter," etc. In each case, she might click on a search result document (e.g., a Wikipedia document) about the corresponding planet. Other users with the same intent are likely to pose a subset of the same queries (albeit in different orders) and to click on the same documents during their respective search sessions. In contrast, if the user intent was to find information related to the Mars candy bar, subsequent refinements are likely to be "mars candy," "mars chocolate," etc., with the document clicks in the corresponding sessions leading to very different documents from those related to the planets.

There are at least two important points to note that distinguish the proposed clustering technique described herein from previous work on query clustering (e.g., that of Beeferman et al. mentioned above).

First, in the presently proposed clustering technique described herein, entire paths from the query to the set of documents, rather than just the documents viewed by users upon seeing the search results of the query, are considered. This is important because the path that the user follows provides additional context about the user's intent, and for certain queries, the relevant documents are only found after some exploration by the user.

Second, the paths followed from the refinement $r_i$ and $r_j$ are explored in the context of the original query q. For example, the queries "sun" and "pluto," though unambiguous in the context of mars, might lead to very different sets of result documents, e.g., webpages about the company Sun Microsystems and the Disney character Pluto the Dog, respectively, if the queries are not submitted in sessions including the query "mars."

The above intuition is captured by the hypothesis that the set of documents reachable from a query refinement $r_i$, after starting from the query q, are representative of the user's underlying intent in selecting $r_i$ after q. The query clustering problem can hence be formulated as clustering by intent. Specifically, if there is an edge $(r_i, r_j)$ in the graph G, or if both $r_i$ and $r_j$ have edges to the same documents, then users in $r_i$'s typical session will reach the same documents as users in $r_j$'s typical session. On the other hand, if there is no path from $r_i$ to $r_j$, and if $r_i$ and $r_j$ have few (or no) common documents, then users in $r_i$'s typical session are unlikely to visit the same documents as users in $r_j$'s typical session. Accordingly, if the queries are clustered such that (1) the number of edges between query nodes in different clusters and (2) the document nodes that have edges from multiple clusters are minimized, then, the presently proposed intuition is effectively satisfied.

Figure 1B:
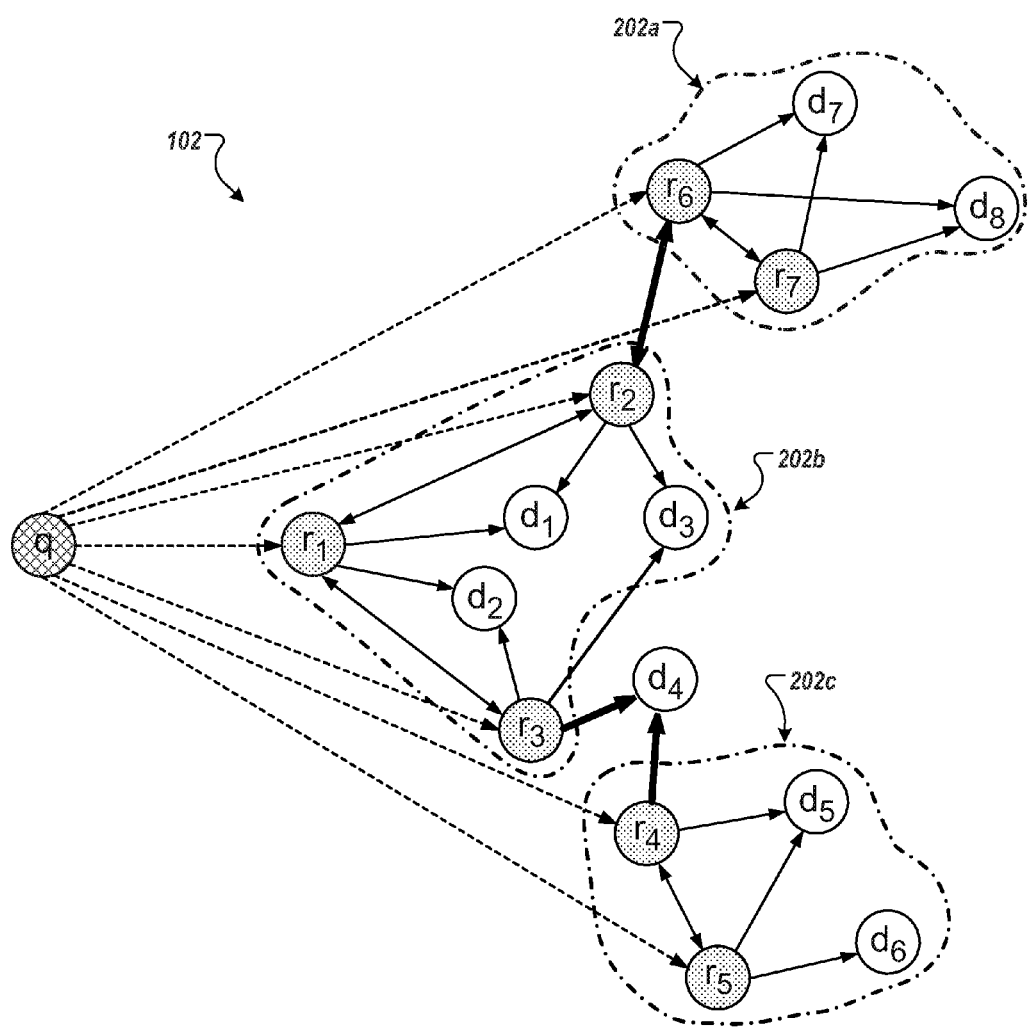
FIG. 1B illustrates an example partitioning of the graph illustrated in FIG. 1A.

FIG. 1B illustrates a partition of the query nodes (e.g., the nodes $r_1, \ldots, r_7$) into 3 clusters (e.g., the clusters 202a, 202b, and 202c). There is only one edge $(r_2, r_6)$ between refinement queries in the different clusters, and only one document $d_4$ with edges (e.g., the edges $(r_3, d_4)$ and $(r_4, d_4)$) from queries in different clusters. The $(q, r_i)$ edges (e.g., indicated by the dashed lines in FIG. 1B) are excluded since the goal here is to cluster the refinements.

The above clustering based on partitioning the graph G naturally maps to a variant of the classical min k-cut problem. Specifically, suppose the number of desirable clusters k are known, the clustering objective can be defined as follows:

Problem Statement 1: Given a graph, G, and the number, k, of required clusters, partition the set of refinement vertices in G into proper subsets $R=\{R_1, \ldots, R_k\}$, such that the following cost function is minimized:

$$\sum_{(r_i, r_j)} w(r_i, r_j) \times 1\{r_i \in R_l, r_j \in R_m, R_l \neq R_m\} + \quad \text{(Formula 1)}$$

$$\sum_{(r_i, d)} w(r_i, d) \times 1\{r_i \in R_l, \exists (r_j, d) \in E, r_j \in R_m, R_l \neq R_m\} +,$$

where $1\{c\}$ is an indicator variable equal to 1 if condition c is true and 0 otherwise; and where $w(r_i, r_j)$ is the weight for the edge between $r_i$ and $r_j$, and $w(r_i, d)$ is the weight for the edge between $r_i$ and d.

Unlike the classical min k-cut problem, the goal here is to cluster only the nodes corresponding to query refinements, whereas the document nodes are not included in the clusters. This would result in a more efficient algorithm than if all nodes are included in the clusters.

Although the clustering objective is presented herein as a variant of the min k-cut problem, the graph formulation of the problem presented herein can also be mapped to the correlation clustering described in N. Bansal, A. Blum, and S. Chawla, Correlation clustering, Machine Learning, 56(1 3):89 113, 2004. The mapping is very similar to the reduction to the min k-cut. Correlation clustering, motivated by document clustering, gives an advantage over the classical min k-cut in that it does not require a pre-specified k number of target clusters. The solution we propose herein works for the correlation clustering formulation as well as it does for the min k-cut formulation.

A key insight underlying the presently proposed clustering technique is that the graph of transitions, G, has a very natural interpretation as a Markov model, describing transition probabilities between states. Furthermore, the absorbing states of this Markov model are the nodes in G corresponding to clicked documents. As a result, each of the query-refinement nodes in G can be characterized by the vector of probabilities of reaching each of the absorbing states. Clustering the query refinement nodes based on these vectors is consistent with the intuition of clustering by user intent as described above. Furthermore, as an added benefit, the computational complexity of clustering is significantly lower than that of min k-cut.

The above construction of the graph G naturally lends itself to a Markov process interpretation. The weights on the edges of the graph are computed based on the probability of transitions between the states. Hence, each node can be viewed as a Markov state with the edge weights being the transition probabilities between the corresponding states.

Figure 2:
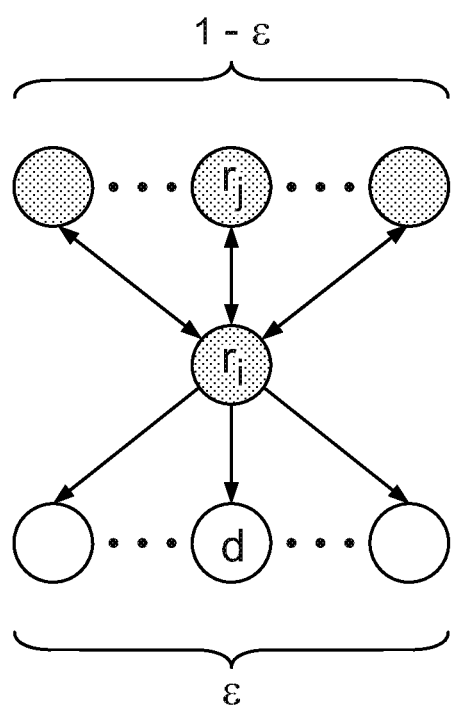
FIG. 2 illustrates an example of normalizing transition probabilities.

To ensure that the graph represents a valid Markov chain, the outgoing edge weights from each node can be normalized to sum up to 1. This can be done by defining a parameter $\epsilon$, the document escape probability, which represents the probability that there will be a transition from a query-refinement node to a document node. Consequently, with probability $1-\epsilon$, there will be transition from a refinement node to another refinement node (as illustrated in FIG. 2). Although the value of $\epsilon$ does not significantly affect the results, the usefulness of $\epsilon$ in our model will be discussed in more details later in this specification.

We define the transition probability matrix P for the graph G, as follows:

for each $(r_i, d)$, where $d \in D(r_i)$, and $n_d(d|r_i)$ is the number of times a user clicks on the document d, a result of the query $r_i$, then:

$$P[r_i, d] = \varepsilon \times \frac{n_d(d|r_i)}{\sum_{d_k \in D(r_i)} n_d(d_k|r_i)} \quad \text{(Formula 2)}$$

for each $(r_i, r_j)$, where $r_j$ is a refinement of both $r_i$ and q (i.e., $r_j \in R(q) \cap R(r_i)$), and $n_s(r_i, r_j)$ is the number of sessions in which $r_i$ and $r_j$ co-occur, then:

$$P[r_i, r_j] = (1 - \varepsilon) \times \frac{n_s(r_i, r_j)}{\sum_{r_k \in R(q) \cap Q(r_i)} n_s(r_i, r_k)} \quad \text{(Formula 3)}$$

for each document d (all of which are terminal in G), self-transitions are added:

$$P[d,d] = 1 \quad \text{(Formula 4)}$$

Note that due to the sparsity of session logs, $n_s(r_i, r_j)$ does not need to be restricted to only the sessions where $r_i$ follows $r_j$, and instead, all sessions in which they co-occur can be considered. Also, as mentioned above, the transitions between refinement nodes can be restricted to be only those in the context of the original query q, i.e., its set of refinements R. Transitions to nodes that are not in R will be discussed below.

Though the construction of the Markov model is dependent on the original query q, q and its transitions do not need to be considered as part of the model.

In Markov process theory, a state is absorbing if it is impossible to escape from the state, and is transient if there is a non-zero probability of returning to the state. Using this terminology, each refinement node is a transient state (since the transitions between refinements are bi-directional), while each document node is an absorbing state (only self-transitions). Moreover, since at least one absorbing state is accessible from each of the transient states, the Markov chain is said to be absorbing. In other words, if one were to perform an infinite-step random walk on this Markov chain (starting at any state), one will always escape the refinement states and be absorbed by one of the document states.

Figure 3:
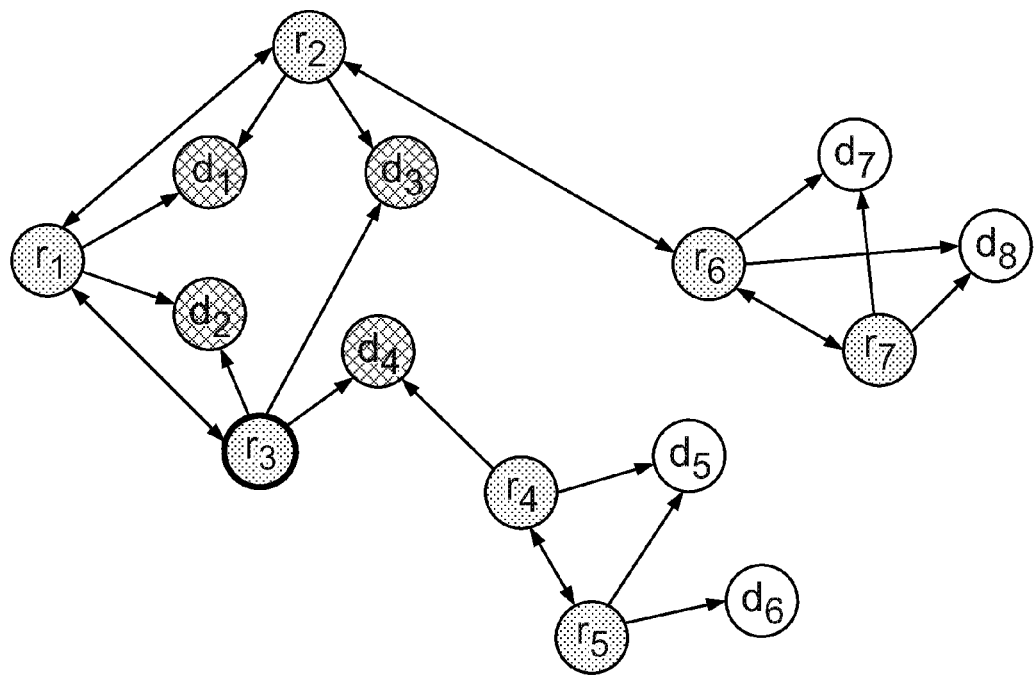
FIG. 3 illustrates example random walks through a graph.
Figure 3:
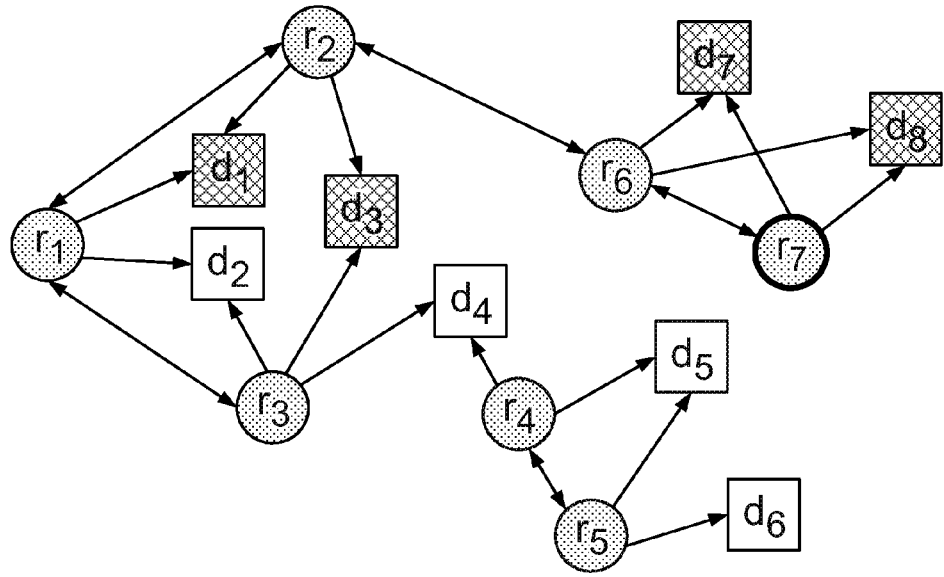

In Markov process theory, the probability of absorption in a given absorbing state depends on the initial state. As shown in FIG. 3, if a random walker starts at $r_3$, she is likely to satisfy her search intent at the documents close to $r_3$, i.e., $d_4, d_2, d_1$, and $d_3$ (e.g., as shown in the upper graph in FIG. 3). On the other hand, if she starts at $r_7$, she is likely to satisfy her search intent at the documents close to $r_7$, i.e., $d_8, d_7, d_3$, and $d_1$ (e.g., as shown in the lower graph in FIG. 3). Indeed, the limiting distribution is highly dependent on the starting node. In the description below, the term "limiting distribution" and "absorption distribution" will be used interchangeably. Because the Markov chain is absorbing, the two distributions are equivalent.

The fact that the limiting distribution is conditioned on the start node can be used to determine which documents are most descriptive of a query. Specifically, a random walk can be performed starting from each of the refinements $r_i$ of the query q, to obtain the specific limiting distribution vector $\vec{l}_i$ for the refinement $r_i$. Each entry in $\vec{l}_i$ will correspond to a document node and equal the probability of reaching that document at the end of an infinite random walk starting from $r_i$. Then to measure the similarity between two refinements ri and rj, their corresponding limiting distribution vectors $\vec{l}_i$ and $\vec{l}_j$ can be compared. The above process allows refinements to be clustered as points in some n-dimensional space and can be used to determine which refinements are likely to represent the same user intent.

An example pseudo-code of the algorithm is shown in Algorithm 1 below. The inputs are the graph G(q) constructed as described earlier and the number of desired clusters k. There are two parameters, $\epsilon$, the document escape probability, and n, a parameter to the random walk which will be described later. In the first step, the transition matrix is initialized as already described. Each of the other steps of the algorithm is described below.

Algorithm 1: clusterRefinementsByIntent(G(q), k, $\epsilon$, n)
P←initializeTransitionMatrix(G(q), $\epsilon$)
P'←calculateLimitingDistributions(P, n)
L←extractAbsorptionDistributions(G(q), P')
R←clusterVectors(L, k)
return R First, relationship between this random walk clustering formulation and the min k-cut formulation are explained as follows. Recall the goal of minimizing the edge weights between the clusters in the random walk clustering formation. By performing a random walk from each of the refinements, nodes that are in the vicinity of the refinements can be discovered and the probabilities that these nodes are likely to be visited can be determined. However, it is not the topology of the graph which influences the clustering decisions most, but the transition probabilities. These probabilities effectively enforce the objectives of minimizing the weight between the clusters. To see why this is the case, consider the graph in FIG. 3 again. Depending on the transition probability of the $(r_2, r_6)$ edge, $\{r_1, r_2, r_3\}$ may either get merged with $\{r_6, r_7\}$ or stay separate. The random walk, by pushing the probability mass down the edges with more weight, forces refinements connected by high-weight edges to be clustered together. This way, edges with high weight end up inside of the clusters and edges with low weight end up between the clusters, thus minimizing the cost function in Problem Statement 1 (Formula 1).

Next, the method for computing the absorption distributions of the presently proposed Markov model is described. Given the transition matrix P, the matrix product P×P is such that its [i,j] entry will be the 2-step transition probability from state i to state j. Following the same pattern, P"[i,j] A has the n-step transition probability from i to j. As n→∞, P" approaches the limiting distribution. In particular, the $\lim_{n \to \infty}$ P"[i,j] entry is equal to the limiting fraction of time the random walker spends in state j when starting from state i.

Since the Markov chain in the presently proposed Markov model is absorbing, a stronger claim can be made. Specifically, the visit probability, i.e., the probability of visiting an absorbing state d within an n-step random walk starting at some state $r_i$, is equal to the probability of transitioning from state $r_i$ to state d in n steps. Hence, we can state the following can be stated:

Proposition 1: Given the transition matrix P, computed for the presently proposed Markov model, the row of $\lim_{n \to \infty}$ P" corresponding to a node v is the visit probability distribution vector of the random walk started at v.

Specifically, the visit probability distribution for a refinement $r_i$ captures the probability that a user will eventually reach different documents during a search session that starts with q and includes $r_i$. It is thus representative of the hypothesized user intent underlying $r_i$ in the context of q.

Using Proposition 1, a random walk calculation can be performed via a simple matrix product shown in Algorithm 2 below. As shown in Algorithm 2, the limiting distribution is approximated by $P''^n$ for a suitably chosen n (described below).

Algorithm 2: calculateLimitingDistribution(P, n)
$P' \leftarrow P''^n$
return P'

Note here that calculating $P''^n$ is not the only way to calculate visit probabilities. An alternative method is to use the fundamental matrix of the presently proposed Markov chain.

Although this method is of the same computational complexity as the matrix product method described above (e.g., $O(n^3)$ for an n×n matrix), it requires finding the inverse of a matrix and, thus, is slightly less intuitive. More importantly, for realistic values of $\epsilon$, the above proposed algorithm converges very quickly, making the above described matrix-product method even more appealing.

In any long random walk on an absorbing Markov model, all the probability mass gets absorbed by the absorbing states. This implies that the columns of $\lim_{n \to \infty} P''^n$ corresponding to the transient states (i.e., refinements in our case) will always be zero. Hence, when working with limiting distributions, only the columns corresponding to the document states (i.e., absorbing states) need to be considered. Using this fact and Proposition 2, Algorithm 3 for extracting the limiting distributions from $P''^n$ can be performed.

Algorithm 3: extractLimitDistributions(R, $P''^n$)
for $r_i \in R$ do
$\vec{1}_i \leftarrow$ vector of size $|\cup_{r_i \in R(q)} D(r_i)|$
for $d \in \cup_{r_i \in R(q)} D(r_i)$ do
$\vec{1}_i[d] = P''^n[r_i, d]$
end for
end for
$L = \{\vec{1}_1, \ldots \vec{1}_r\}$, where $r = |R(q)|$
return L The parameter $\epsilon$ in our Markov model controls how likely a user is to click on a document from any refinement node. In a sense, this parameter controls how "exploratory" the user is believed to be, and in practice it can be used to control the convergence rate of the above proposed algorithms. Experiments show that for any practical values of $\epsilon$, the algorithm converges quickly. For example, with a value of $\epsilon = 0.6$, after four iterations (i.e., transition matrix multiplications), the unabsorbed probability mass remaining was only $(0.4)^4 = 0.0256$. Even for $\epsilon = 0.3$ (corresponding to a very "exploratory" browsing behavior), it takes just seven iterations to absorb over 90% of the probability mass. Since the number of clustered refinements almost never exceeds 1,000, it is possible to calculate $P''^n$ quickly in practice.

A high number of iterations (parameter n of the algorithm), just like low value of $\epsilon$, allows the discovery of many remote refinements, thus suggesting an exploratory nature of user behavior. On the other hand, a low number of iterations and respectively high value of $\epsilon$ makes random walks shorter, indicating more focused user intents. Although the results of the clustering are not significantly affected when the value of $\epsilon$ and the number of iterations are changed, it has been found that lower numbers of iterations (e.g., 3-5) and higher values of $\epsilon$ (e.g., 0.5-0.7) work better, suggesting that most queries have rather focused user intents.

For ease of exposition, in the above discussion of the model, the possibility of a drift in user intent to another topic was not mentioned. The assumption so far is that after issuing original query q, the user is always going to satisfy her current intent by submitting one or more query refinements, and eventually clicking on one of their documents. Realistically, however, it is possible that before clicking on any result document URL, the user may change her mind and submit a query that would not be among the query refinements of the original query q. In other words, the user may abandon whatever intent or information need she is after and pursue a new information need. Such off-topic drift can be modeled in the framework presented above in this specification as well.

Figure 4:
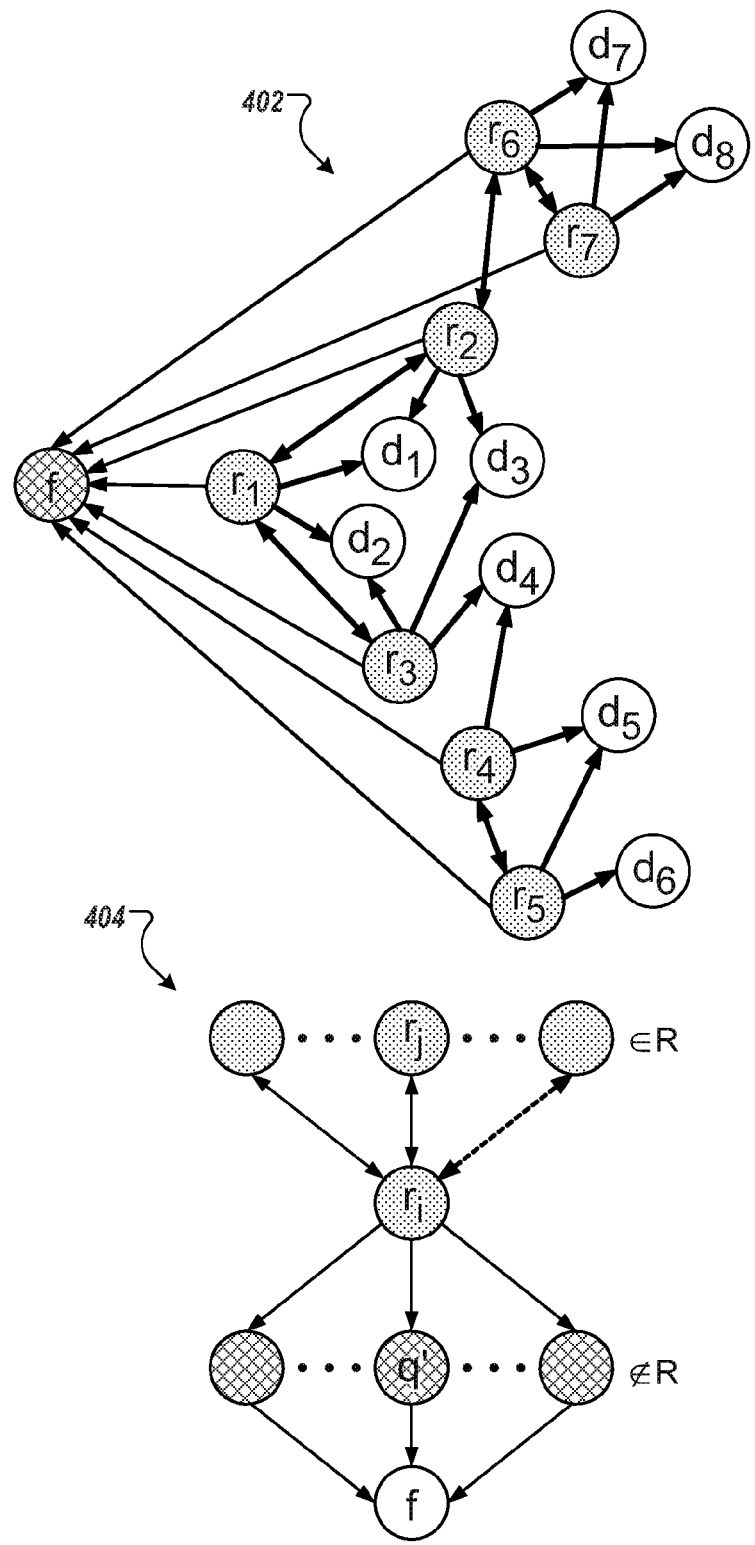
FIG. 4 illustrates adding a transition to an absorbing off-topic state in the graph illustrated in FIG. 1A.

Specifically, a new state f can be added to the proposed Markov model described above to signify the user's transition off topic (e.g., see the added node f in the graph 402 in FIG. 4). Then, from each of the query refinements $r_i \in R(q)$, an off-topic transition $(r_i, f)$ can be added. Once the user switches off-topic, it is assumed that she does not come back to the original topic, thus f is modeled as an absorbing state with no outgoing edges.

To complete the construction, the transition probability is determined for $(r_i, f)$. The original model described above without the off-topic drift is essentially equivalent to that probability being zero. One option would be to set the probability to some constant, and then respectively normalize other transition probabilities. However, using a constant can be inaccurate. Consider the refinements "mercury" and "water on mars" for the query "mars." "Mercury" is more likely to drift off-topic, since it has a number of interpretations, such as the car make and the chemical element, that are unrelated to original query "mars." Hence, it seems natural to have the transition probability for $(r_i, f)$ be dependent on ri.

Recall from the construction of G described above, that for a given refinement $r_i$ of q, transitions in all sessions are reviewed (regardless of whether the sessions begin with q or not), but only the transitions from the given refinement $r_i$ of q to other refinements of q are considered. To estimate the drift beginning from $r_i$ the transitions from $r_i$ to queries that are not in R(q) are also considered. As illustrated in the graph 404 shown in the lower portion of FIG. 4, the related queries' off-topic drift can be estimated by summing over the transition probabilities of all such queries q' that are not in R(q).

Formally, for a query refinement $r_i \in R(q)$, the $(r_i, f)$ transition probability is set as:

$$P[r_i, f] = (1 - \varepsilon) \times \frac{\sum_{q' \in (Q(r_i) - R(q))} n_s(r_i, q')}{\sum_{q' \in Q(r_i)} n_s(r_i, q')} \quad \text{(Formula 5)}$$

Accordingly, all transitions $(r_i, r_j)$ between any two query refinements $r_i, r_j \in R$, $r_i \neq r_j$ will no longer be conditioned on $r_j \in R$:

$$P[r_i, r_j] = (1 - \varepsilon) \times \frac{n_s(r_i, r_j)}{\sum_{q' \in Q(r_i)} n_s(r_i, q')} \quad \text{(Formula 6)}$$

The varying off-topic drift plays an interesting role in the clustering. In some cases, if the off-topic drift is left out of the presently proposed model, then the entire transition probability mass of r can be pushed by the random walk to other nodes that do not quite merit it. For example, consider the case where $r_i$ has a high off-topic probability, and only one on-topic transition to a different refinement $r_j$. Ignoring the off-topic transitions can imply that all the probability mass is transferred from $r_i$ to $r_j$. This will make the limiting distribution of $r_i$ and $r_j$ almost identical, making them appear to be more similar that they really are. This effect can be exacerbated by the probabilities being pushed transitively along the Markov chain to other refinement nodes, thereby rendering the clustering less effective.

To account for the fact that transition probabilities are not conditioned on q, some attenuation can be added to the off-topic probability summed over all q'∈(Qi−R). Note that transitions between queries in R may need to be adjusted accordingly as well. This is effectively the middle ground between the original proposed model with no off-topic probability and the modified model where the off-topic probability sum is taken as is.

The above description illustrates how the problem of clustering query refinements can be mapped into a problem of Euclidean-vector clustering. Implementations of the clustering step are described as follows.

One of the advantages of the presently proposed models is that they can employ any algorithm for clustering Euclidean vectors (e.g., hierarchical, density based, partitional, or graph based).

However, methods that suffer from chaining and/or are designed for elongated transitive clusters sometimes do not perform well in this context. As mentioned above, user intents tend to drift within sessions, thus many queries may be transitively (e.g., through 2-4 other queries) related to almost every other query. For this reason, single-link and group-average clustering algorithms can perform poorly here. On the other hand, complete-link clustering can be very effective.

Based on experiments on different clustering algorithms and similarity measures, it is found that complete-link clustering and cosine similarity work well. Algorithm 4 shows an example clustering algorithm. Suppose $sim(r_i, r_j)$ is the cosine similarity between the limiting distributions of refinements $r_i$ and $r_j$. Then the complete-link similarity between two sets of refinements $R_l$ and $R_m$ is the minimum similarity between two of their respective refinements, i.e., completelink$(R_l, R_m)$=min sim$(r_i, r_j)$ (Formula 7)

where the minimum is taken over all $r_i$ in $R_l$ and over all $r_j$ in $R_m$.

The above algorithm works by picking the pair of current clusters that have the highest value for completelink similarity and merging them. This proceeds until only the required number of clusters remain.

Cosine similarity is effective for comparing two discrete probability distributions. Meanwhile, complete-link clustering avoids chaining and provides guarantees on similarity within each cluster.

Algorithm 4: clusterVectors(G, L, k)
R←0
for $r_i$∈R do
R←R∪{$r_i$}
end for
while |R|>k do
⟨$R_l, R_m$⟩←arg max $R_l$≠$R_m$∈R completelink($R_l, R_m$)
$R_l$←$R_l$∪$R_m$
R←R−$R_m$
end while
return R In some cases, the high dimensionality of the limiting distribution vectors could be a concern for the presently proposed algorithm. To mitigate the concern, in some implementations, the size of the vectors can be limited as follows. First, a limited number of query refinements are considered (e.g., up to 80 query refinements can be considered). Second, the number of document states off of each refinement can be limited (e.g., to 15 documents per refinement). Together, these limiting conditions can lead to an upper bound of 1200 on the dimensionality of limiting distribution vectors. These limitations are justified in practice because refinements beyond the top 80 usually have probability mass of less than 0.002, and document clicks beyond the top 15 are rare and most of the time statistically insignificant. Hence, such filtering not only simplifies the clustering, but also eliminates potential "noise."

Some of the user queries have ambiguous related queries that may bias clustering as well as the limiting distributions themselves. For example, consider the query "kobe bryant." Incidentally, one of its related queries is "kobe." Because "kobe" is synonymous to "kobe bryant", the query "kobe" may co-occur with many related queries R of "kobe bryant". Hence, every related query of "kobe bryant" is transitively related to every query in R. In a sample clustering process, a random walk is performed from any related query in R, all documents of all R queries can be reached within two steps. As a result, different queries content-wise now may have similar limiting distributions which will bias the clustering.

This problem is not specific to synonyms. Some refinement-like related queries may also be ambiguous. For example, consider the query "jaguar," which has become a canonical example for disambiguation. This query may refer to an animal, a car brand, or an Apple operating system. Now suppose "jaguar" has a related query "jaguar facts." Although "jaguar facts" is unlikely to refer to the operating system, it is still ambiguous. For example, it could refer to the car brand as well as to the animal. Accordingly, "jaguar facts" may co-occur with almost every other related query of "jaguar" biasing the random walk and, effectively, biasing the clustering.

Detecting such ambiguous related queries is non-trivial. For the synonym-type ambiguities, a string edit distance (e.g., Levenshtein distance) heuristic can be used to detect such ambiguities (i.e., related query $r_i$ is ambiguous if it has string edit distance to q within some threshold).

To contain the effect of ambiguous queries on the results, the following changes can be made to Algorithm 1:
  Before InitializeTransitionMatrix, select a set of ambiguous related queries A ⊂ R using a heuristic.
  After Initialize TransitionMatrix, for any related query $r_i$∈R and an ambiguous query a ∈A, set w($r_i$, f)←w($r_i$, f)+w($r_i$, a) and w($r_i$, a)=0 (i.e., remove transitions to ambiguous queries).
  Invoke ClusterVectors only on R−A.
  Invoke ClusterVectors again on R ∪A.

In general, to ensure quality, no fewer than 25 clusters are used, as many pairs of 80 related queries either did not co-occur in sessions or did not overlap in clicks. With 25 target clusters, even though there were often more than one cluster per each user intent, over-clustering is rare.

In some implementations, instead of using a pre-set number of clusters, similarity thresholds can be used to control the clustering. In some implementations, a custom similarity threshold as a function of the query parameters can be used (indeed, "jaguar" may have more user intents than "kobe bryant stats").

In some implementations, once the clusters are generated, they can be used, for example, by a search engine, to provide better query refinement suggestions for users.

Figure 5:
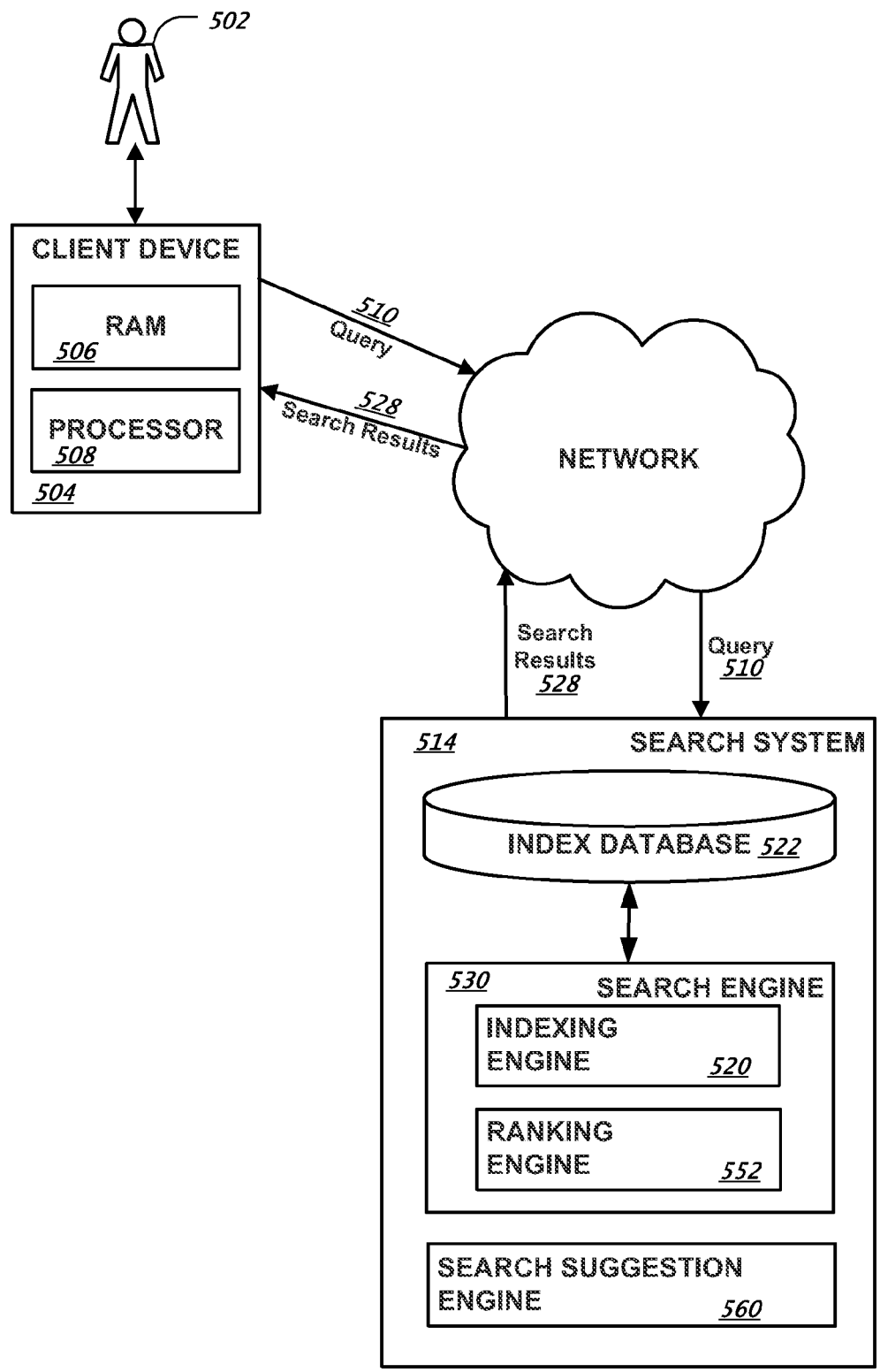
FIG. 5 illustrates an example search system.

FIG. 5 illustrates an example search system 514 for providing search results relevant to submitted queries as can be implemented in an Internet, an intranet, or other client and server environment. The search system 514 is an example information retrieval system.

A user 502 interacts with the search system 514 through a client device 504. For example, the client device 504 can be or include a computer (e.g., a personal computer, a mobile phone, etc.) coupled to the search system 514 through a wired or wireless local area network (LAN) or wide area network (WAN), e.g., the Internet. In some implementations, the search system 514 and the client device 504 are both implemented in the same machine. For example, a user can install a desktop search application on the client device 504. The client device 504 will generally include a random access memory (RAM) 506 and a processor 508.

A user 502 submits a query 510 to a search engine 530 within a search system 514. When the user 502 submits a query 510, the query 510 is transmitted through a network to the search system 514. The search system 514 can be implemented as, for example, computer programs running on one or more computers in one or more locations that are coupled to each other through a network. In some implementations, the search system 514 includes an index database 522 and a search engine 530. The search system 514 responds to the query 510 by generating search results 528, which are transmitted through the network to the client device 504 in a form that can be presented to the user 502 (e.g., in a search results web page to be displayed in a web browser running on the client device 204). The search results web page can also include one or more search suggestions for the query 510.

When the query 510 is received by the search engine 530, the search engine 530 identifies documents that match the query 510. The search engine 530 will generally include an indexing engine 520 that indexes documents (e.g., web pages, images, multimedia content, or news articles on the Internet) found by the search system 514, for example, documents found while crawling the Internet, an index database 522 that stores the index information, and a ranking engine 552 (or other software) to rank the documents that match the query 510. The search engine 530 transmits the search results 528 through the network to the client device 504 for presentation to the user 502.

The search system can further include a search suggestion engine 560 that identifies and presents search suggestions to the user. The search suggestions can be derived from the clustered query refinements for the query, as will be described below with reference to FIG. 6.

Figure 6:
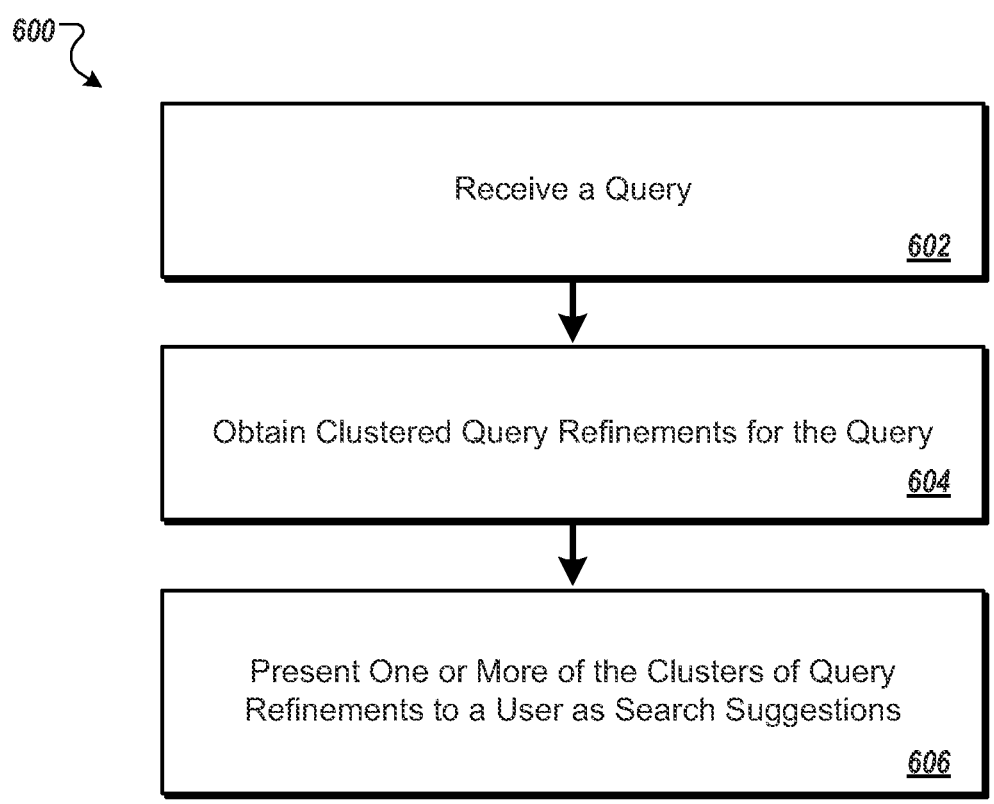
FIG. 6 illustrates an example method for presenting search suggestions in response to a query.

FIG. 6 illustrates an example method 600 for presenting search suggestions in response to a user-submitted search query. For convenience, the method 600 will be described with reference to a system that performs the method. The system can be, for example, the search system 514 described above with reference to FIG. 5.

The system receives a query (602), for example, as described above with reference to FIG. 5. The system obtains clustered query refinements for the query (604). In some implementations, the clustered query refinements are generated on the fly, in response to receiving a query, using the algorithms described above. In other implementations, the clustered query refinements are generated in advance using the algorithms described above, and then stored, for example, in a database. In such implementations, obtaining the clustered query refinements includes obtaining the refinements from the database.

The system then presents one or more of the clusters of query refinements as search suggestions (606). The search engine presents each of the clusters as a search suggestion by presenting one or more of the query refinements from one or more of the clusters as search suggestions. An example presentation is described below, with reference to FIG. 7.

In some implementations, the one or more clusters include all of the clusters. In other implementations, the one or more clusters are less than all of the clusters. In these implementations, the one or more clusters can be chosen, for example, by selecting the clusters having query refinements with the highest aggregate transition probabilities for the query refinements in the cluster. The transition probabilities can be determined, for example, as described above. Other techniques for selecting the one or more clusters can also be used. For example, the popularity for each query refinement in a cluster can be combined (e.g., summed or averaged), and the clusters having the highest overall probability can be selected. The probability of a query refinement is the number of times users submit queries for the query refinement.

The one or more query refinements from each cluster can be all query refinements in the cluster, or can be a selected number of query refinements. For example, the one or more query refinements can be a top number of query refinements from each cluster, where the top number is all query refinements whose transition probabilities satisfy a threshold, or a predetermined number of query refinements with the highest transition probabilities in each cluster. The transition probabilities can be determined, for example, as described above.

Each search suggestion can be presented as a selectable element in a graphical user interface. For example, the search suggestions can be hyperlinks in a search results page. The anchor text of the hyperlink can correspond to the text of the search suggestion. When a user clicks on the hyperlink, the search engine presents search results responsive to a query for the search suggestion. Alternatively, when a user clicks on the hyperlink, the user can be presented with additional search suggestions for query refinements from the same cluster.

In some implementations, the search suggestions from different clusters are visibly separated in the user interface. For example, the search suggestions from one or more of the clusters can be presented in a separate column. In some implementations, each column includes a selectable user interface element representative of the cluster. When a user selects the user interface element, the user can be provided with additional search suggestions for the cluster.

Figure 7:
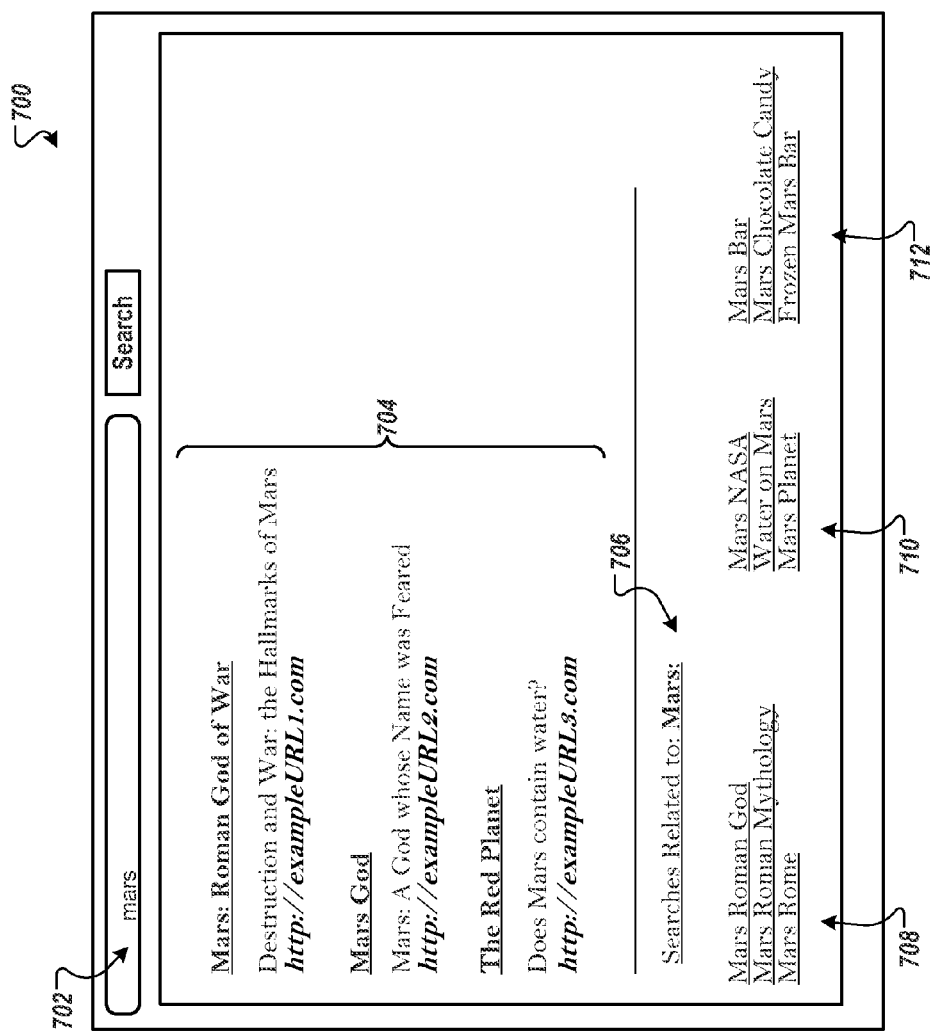
FIG. 7 illustrates an example graphical user interface that presents search results and search suggestions in response to a query.

FIG. 7 illustrates an example graphical user interface 700 that presents search results 704 in response to the query "mars" 702, and also presents search suggestions 706 for the query 702.

The search results 704 are identified by a search engine, for example, as described above with reference to FIG. 5. A user will not always be satisfied with the search results 704 generated in response to a query. Users can be unsatisfied, for example, when the queries they submit are too broad. For example, when a user submits "mars" but is really looking for "the planet Mars," the search engine may identify search results that are relevant to other uses of the word "mars" but are not relevant to the planet. Users can also be unsatisfied, for example, when the queries they submit use non-standard or incorrect terminology. Other reasons for user dissatisfaction are also possible.

Therefore, the user interface 700 includes a group of search suggestions 706, e.g., related queries that a user may find have responsive search results that are more relevant to the user's interests. The search suggestions 706 are divided into columns according to their corresponding clusters. For example, column 708 corresponds to the cluster for Mars the Roman god, column 710 corresponds to the cluster for Mars the planet, and column 712 corresponds to the cluster for Mars the candy bar.

When a user selects one of the search suggestions 706, the search engine presents a new set of search results responsive to the search suggestion in the user interface 700 and may optionally present a new group of search suggestions for the selected search suggestion.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions encoded on a computer storage medium for execution by, or to control the operation of, data processing apparatus. Alternatively or in addition, the program instructions can be encoded on a propagated signal that is an artificially generated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "data processing apparatus" encompasses all kinds of apparatus, devices, and machines for processing data, including by way of example a programmable processor, a computer, or multiple processors or computers. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing or executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A computer-implemented method, comprising:
    identifying a plurality of refinements R(q) of a first search query q, each refinement r∈R(q) being a search query that follows the first search query q in a session of queries submitted to a search system;
    identifying a document set D(r) of each of the refinements r, the document set of a refinement being the documents d that are search results presented in response to the refinement by the search system and that have received user selection while being presented as the search results;
    building a representation of a graph G for the first search query q, wherein the graph G has a node for the first search query q, a node for each of the refinements r, and a node for each document d in the document sets of the refinements, and wherein the graph G has edges from the first search query node q to each of the refinements nodes r, edges from the first search query q to each document d in the respective document set D(q) of the first search query q, edges from each refinement r to each document in the respective document set D(r) of the refinement r, and edges from each refinement r to each co-occurring query of the refinement r;
    building a transition probability matrix P for the graph G that includes the following elements:
        for each edge $(r_i, d)$, where $d \in D(r_i)$ and $n_d(d|r_i)$ is the number of user selections received by the document d, a result of the query $r_i$, then:

$$P[r_i, d] = \varepsilon \times \frac{n_d(d \mid r_i)}{\sum_{d_k \in D(r_i)} n_d(d_k \mid r_i)},$$

for each edge $(r_i, r_j)$, where $r_j$ is a refinement of both $r_i$ and q (i.e., $r_j \in R(q) \cap R(r_i)$), and $n_s(r_i, r_j)$ is the number of sessions in which $r_i$ and $r_j$ co-occur, then:

$$P[r_i, r_j] = (1 - \varepsilon) \times \frac{n_s(r_i, r_j)}{\sum_{r_k \in R(q) \cap Q(r_i)} n_s(r_i, r_k)},$$

for each document d (all of which are terminal in G), then self-transitions:

$P[d,d]=1$ where M is a numerical parameter between 0 and 1;
    calculating a visit probability vector for each refinement in the plurality of refinements R(q) from the transition probability matrix P, where each vector has elements representing a probability for each document in the document set D(q) and the document sets of the refinements R(q); and
    clustering the refinements into refinement clusters by partitioning the visit probability vectors into proper subsets; and
    deriving one or more search suggestions for the first search query based on the refinement clusters.

2. A computer-implemented method, comprising:
    identifying a plurality of refinements R(q) of a first search query q, each refinement r∈R(q) being a search query that follows the first query q in a session of queries submitted to a search system;
    identifying a document set D(r) of each of the refinements r, the document set of a refinement being the documents d that have been presented as search results in response to the refinement by the search system and that have received user selections while being presented as the search results;
    building a representation of a graph G for the first search query q, wherein the graph G has a node for the first search query q, a node for each of the refinements r, a node for each document d in the document sets of the refinements, and an off-topic node for an off-topic state f, and wherein the graph G has edges from the first search query node q to each of the refinements nodes r, edges from the first search query q to each document d in the respective document set D(q) of the first search query q, edges from each refinement r to each document d in the respective document set D(r) of the refinement r, and edges from each refinement r to each co-occurring query Q(r) of the refinement r and to the off-topic node;
    building a transition probability matrix P for the graph G that includes the following elements:
        for each edge $(r_i, d)$, where $d \in D(r_i)$ and $n_d(d|r_i)$ is the number of user selections received by the document d, a result of the query $r_i$:

$$P[r_i, d] = \varepsilon \times \frac{n_d(d \mid r_i)}{\sum_{d_k \in D(r_i)} (d_k \mid r_i)},$$

for each edge $(r_i, f)$:

$$P[r_i, f] = (1 - \varepsilon) \times \frac{\sum_{q' \in (Q(r_i) - R(q))} n_s(r_i, q')}{\sum_{q' \in Q(r_i)} n_s(r_i, q')},$$

for each edge $(r_i, r_j)$:

$$P[r_i, r_j] = (1-\varepsilon) \times \frac{n_s(r_i, r_j)}{\sum_{q' \in Q(r_i)} n_s(r_i, q')},$$

for each document d (all of which are terminal in G), then self-transitions:

$$P[d,d]=1$$

where M is a numerical parameter between 0 and 1;

calculating a visit probability vector for each refinement in the plurality of refinements R(q) from the transition probability matrix P, where each vector has elements representing a probability for each document in the document set D(q) and the document sets of the refinements R(q); and clustering the refinements into refinement clusters by partitioning the visit probability vectors into proper subsets; and deriving one or more search suggestions for the first search query based on the refinement clusters.

3. A system, comprising:

one or more computers programmed to perform operations comprising:

identifying a plurality of refinements R(q) of a first search query q, each refinement r∈R(q) being a search query that follows the first search query q in a session of queries submitted to a search system;

identifying a document set D(r) of each of the refinements r, the document set of a refinement being the documents d that are search results presented in response to the refinement by the search system and that have received user selection while being presented as the search results;

building a representation of a graph G for the first search query q, wherein the graph G has a node for the first search query q, a node for each of the refinements r, and a node for each document d in the document sets of the refinements, and wherein the graph G has edges from the first search query node q to each of the refinements nodes r, edges from the first search query q to each document d in the respective document set D(q) of the first search query q, edges from each refinement r to each document d in the respective document set D(r) of the refinement r, and edges from each refinement r to each co-occurring query of the refinement r;

building a transition probability matrix P for the graph G that includes the following elements:

for each edge $(r_i, d)$, where $d \in D(r_i)$ and $n_d(d|r_i)$ is the number of user selections received by the document d, a result of the query $r_i$, then:

$$P[r_i, d] = \varepsilon \times \frac{n_d(d|r_i)}{\sum_{d_k \in D(r_i)} n_d(d_k|r_i)},$$

for each edge $(r_i, r_j)$, where $r_j$ is a refinement of both $r_i$ and q (i.e., $r_j \in R(q) \cap R(r_i)$), and $n_s(r_i, r_j)$ is the number of sessions in which $r_i$ and $r_j$ co-occur, then:

$$P[r_i, r_j] = (1-\varepsilon) \times \frac{n_s(r_i, r_j)}{\sum_{r_k \in R(q) \cap Q(r_i)} n_s(r_i, r_k)},$$

for each document d (all of which are terminal in G), then self-transitions:

$$P[d,d]=1$$

where M is a numerical parameter between 0 and 1;

calculating a visit probability vector for each refinement in the plurality of refinements R(q) from the transition probability matrix P, where each vector has elements representing a probability for each document in the document set D(q) and the document sets of the refinements R(q); and clustering the refinements into refinement clusters by partitioning the visit probability vectors into proper subsets; and deriving one or more search suggestions for the first search query based on the refinement clusters.

4. A system, comprising:

one or more computers programmed to perform operations comprising:

identifying a plurality of refinements R(q) of a first search query q, each refinement r∈R(q) being a search query that follows the first query q in a session of queries submitted to a search system;

identifying a document set D(r) of each of the refinements r, the document set of a refinement being the documents d that have been presented as search results in response to the refinement by the search system and that have received user selections while being presented as the search results;

building a representation of a graph G for the first search query q, wherein the graph G has a node for the first search query q, a node for each of the refinements r, a node for each document d in the document sets of the refinements, and an off-topic node for an off-topic state f, and wherein the graph G has edges from the first search query node q to each of the refinements nodes r, edges from the first search query q to each document d in the respective document set D(q) of the first search query q, edges from each refinement r to each document d in the respective document set D(r) of the refinement r, and edges from each refinement r to each co-occurring query Q(r) of the refinement r and to the off-topic node;

building a transition probability matrix P for the graph G that includes the following elements:

for each edge $(r_i, d)$, where $d \in D(r_i)$ and $n_d(d|r_i)$ is the number of user selections received by the document d, a result of the query $r_i$:

$$P[r_i, d] = \varepsilon \times \frac{n_d(d|r_i)}{\sum_{d_k \in D(r_i)} n_d(d_k|r_i)},$$

for each edge $(r_i, f)$:

$$P[r_i, f] = (1-\varepsilon) \times \frac{\sum\limits_{q' \in (Q(r_i) - R(q))} n_s(r_i, q')}{\sum\limits_{q' \in Q(r_i)} n_s(r_i, q')},$$

for each edge $(r_i, r_j)$:

$$P[r_i, r_j] = (1-\varepsilon) \times \frac{n_s(r_i, r_j)}{\sum\limits_{q' \in Q(r_i)} n_s(r_i, q')},$$

for each document d (all of which are terminal in G), then self-transitions:

$P[d,d]=1$ where M is a numerical parameter between 0 and 1;

calculating a visit probability vector for each refinement in the plurality of refinements R(q) from the transition probability matrix P, where each vector has elements representing a probability for each document in the document set D(q) and the document sets of the refinements R(q); and clustering the refinements into refinement clusters by partitioning the visit probability vectors into proper subsets; and deriving one or more search suggestions for the first search query based on the refinement clusters.

5. A non-transitory computer-readable medium having instructions stored thereon, the instructions, when executed by one or more processors, cause the processors to perform operations comprising:

identifying a plurality of refinements R(q) of a first search query q, each refinement r∈R(q) being a search query that follows the first search query q in at least a session of queries submitted to a search system;

identifying a document set D(r) of each of the refinements r, the document set of a refinement being the documents d that are search results presented in response to the refinement by the search system and that have received user selection while being presented as the search results;

building a representation of a graph G for the first search query q, wherein the graph G has a node for the first search query q, a node for each of the refinements r, and a node for each document d in the document sets of the refinements r, and wherein the graph G has edges from the first search query node q to each of the refinements nodes r, edges from the first search query q to each document d in the respective document set D(q) of the first search query q, edges from each refinement r to each document in the respective document set D(r) of the refinement r, and edges from each refinement r to each co-occurring query of the refinement r;

building a transition probability matrix P for the graph G that includes the following elements:

for each edge $(r_i, d)$, where $d \in D(r_i)$ and $n_d(d|r_i)$ is the number of user selections received by the document d, a result of the query $r_i$, then:

$$P[r_i, d] = \varepsilon \times \frac{n_d(d | r_i)}{\sum\limits_{d_k \in D(r_i)} n_d(d_k | r_i)},$$

for each edge $(r_i, r_j)$, where $r_j$ is a refinement of both $r_i$ and q (i.e., $r_j \in R(q) \cap R(r_i)$), and $n_s(r_i, r_j)$ is the number of sessions in which $r_i$ and $r_j$ co-occur, then:

$$P[r_i, r_j] = (1-\varepsilon) \times \frac{n_s(r_i, r_j)}{\sum\limits_{r_k \in R(q) \cap Q(r_i)} n_s(r_i, r_k)},$$

for each document d (all of which are terminal in G), then self-transitions:

$P[d,d]=1$, where M is a numerical parameter between 0 and 1;

calculating a visit probability vector for each refinement in the plurality of refinements R(q) from the transition probability matrix P, where each vector has elements representing a probability for each document in the document set D(q) and the document sets of the refinements R(q); and clustering the refinements into refinement clusters by partitioning the visit probability vectors into proper subsets; and deriving one or more search suggestions for the first search query based on the refinement clusters.

* * * * *

UNITED STATES PATENT AND TRADEMARK OFFICE
CERTIFICATE OF CORRECTION

PATENT NO. : 8,423,538 B1
APPLICATION NO. : 12/938205
DATED : April 16, 2013
INVENTOR(S) : Sadikov It is certified that error appears in the above-identified patent and that said Letters Patent is hereby corrected as shown below:

In the Claims

Claim 1, Line 45, Column 21, delete "din" and insert -- d in --, therefor.

Claim 1, Line 11, Column 22, delete "M" and insert -- $\varepsilon$ --, therefor.

Claim 2, Line 38, Column 22, delete "din" and insert -- d in --, therefor.

Claim 2, Line 42, Column 22, delete "din" and insert -- d in --, therefor.

Claim 2, Line 55, Column 22, delete " $P[r_i, d] = \varepsilon \times \dfrac{n_d(d \mid r_i)}{\sum_{d_k \in D(r_i)} (d_k \mid r_i)}$ " and insert -- $P[r_i, d] = \varepsilon \times \dfrac{n_d(d \mid r_i)}{\sum_{d_k \in D(r_i)} n_d(d_k \mid r_i)}$ --, therefor.

Claim 2, Line 11, Column 23, delete "M" and insert -- $\varepsilon$ --, therefor.

Claim 3, Line 43, Column 23, delete "din" and insert -- d in --, therefor.

Claim 3, Line 11, Column 24, delete "M" and insert -- $\varepsilon$ --, therefor.

Claim 4, Line 44, Column 24, delete "din" and insert -- d in --, therefor.

Claim 4, Line 49, Column 24, delete "din" and insert -- d in --, therefor.

Claim 4, Line 51, Column 24, delete "din" and insert -- d in --, therefor.

Signed and Sealed this
Twenty-fifth Day of February, 2014

Michelle K. Lee
*Deputy Director of the United States Patent and Trademark Office*

Claim 4, Line 19, Column 25, delete "M" and insert -- $\varepsilon$ --, therefor.

Claim 5, Line 35, Column 26, delete "M" and insert -- $\varepsilon$ --, therefor.